(No Model.)
C. C. FAIRLAMB, Dec'd.,
C. T. CLARK, Administrator.
NUT LOCK.
No. 278,230. Patented May 22, 1883.
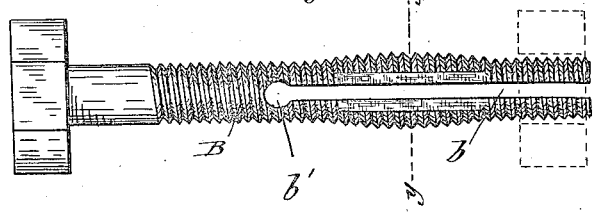 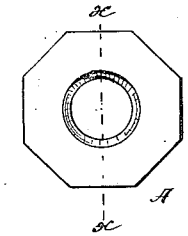
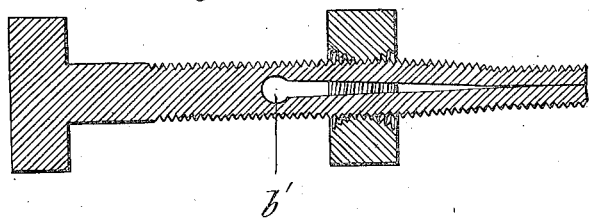
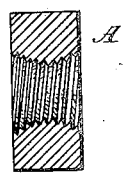 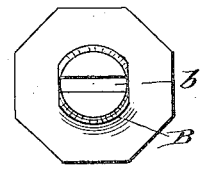
Witnesses
W. C. Coolies
A. M. Best.
Inventor
Charles C. Fairlamb
By Coburn & Thacher
Attorneys

UNITED STATES PATENT OFFICE.

CHARLES C. FAIRLAMB, OF CHICAGO, ILLINOIS; CHARLES T. CLARK, ADMINISTRATOR OF SAID FAIRLAMB, DECEASED.

NUT-LOCK.

SPECIFICATION forming part of Letters Patent No. 278,230, dated May 22, 1883.

Application filed February 21, 1883. (No model.)

*To all whom it may concern:*

Be it known that I, CHARLES C. FAIRLAMB, a citizen of the United States, residing at Chicago, in the county of Cook and State of Illinois, have invented certain new and useful Improvements in Nut-Locks, which are set forth in the following specification, reference being had to the accompanying drawings, in which—

Figure 1 is a side elevation of the bolt; Fig. 2, a plan view of the nut; Fig. 3, a vertical longitudinal section of the bolt and nut combined, the nut being screwed up to its locked position; Fig. 4, a detail section of the nut on the line $x\ x$ of Fig. 2, and Fig. 5 a detail section of the bolt on the line $y\ y$ of Fig. 1.

My invention relates to that class of nut-locks in which the nut is secured by means of the elasticity of some part of the device.

My invention consists of a nut, in combination with a bolt of elastic material, which is slotted longitudinally and has a larger diameter for a part of its length than the smallest diameter of the nut; and it further consists in the several devices and combinations of devices which will be fully set forth hereinafter, and definitely pointed out in the claims.

I will proceed to describe in detail the construction and operation of the devices by means of which my improvements may be embodied in one way, and will then point out more definitely in the claims the special improvements which I believe to be new and which I wish to secure by Letters Patent.

In the accompanying drawings, A represents a threaded nut, of a diameter gradually decreasing from its faces inward.

B is a bolt of elastic material, which is divided into two branches by a slot, $b$. That diameter of the threaded portion of the bolt which is parallel with the inner faces of the branches of the bolt is nowhere greater than the smallest diameter of the nut. That diameter of the bolt, however, which is transverse to the slot—that is, the diameter at right angles to that just mentioned—varies; the threaded part of the bolt gradually swelling from near each end of the slot, as shown in the drawings, in which the line $y\ y$ of Fig. 1 indicates the point of greatest transverse diameter.

For railway fish-plates and other situations where the nut is not required to be frequently removed and replaced the bolt may advantageously be made of wrought-iron; but where the bolt has to be taken out frequently it should be made of hardened steel, the nut being of soft iron, soft steel, or other unhardened material, so that the wear may come principally on the nut, and not on the bolt, which would be more expensive to replace, and also so that the hardened thread of the bolt may operate as a die to keep the nut conformed to its own lines. Moreover, where the nut is frequently passed over a slotted bolt the resulting compression of the branches is very apt in all but the very smallest bolts to break off one or both of them. There is special danger of this when rust has enlarged the diameter of the bolt or reduced that of the opening in the nut, so that the compression must be greater than was originally calculated on. To prevent such breakage I enlarge the slot $b$ at its inner end, so as to form there a tube, $b'$, cylindrical or otherwise, of curvilinear cross-section, running through the bolt transversely and opening on one of its sides into the slot. The diameter of this tube is about twice the greatest distance between the two branches of the bolt. I find that a cylindrical enlargement thus proportioned affords sufficient elasticity to prevent any breakage of the bolt when the branches are compressed, whatever the size of the bolt may be.

In operating the device the nut is started upon the bolt without any difficulty, as its varying diameter, as well as that of the bolt, enables it to compress together the branches of the bolt gradually, and only after the threads of the bolt and nut have been made to register. The bolt is constructed of such proportions with reference to the work for which it is designed that the branches of the bolt will be left thus under compression when the nut is screwed up, or at any rate will be immediately subjected to such compression when the nut begins to unscrew, thus keeping the nut from jarring loose. The varying diameters in both the bolt and nut enable the nut to work over the swollen part of the bolt without cutting either bolt or nut, and the varying diameter of the nut facilitates the registering of the nut with the bolt when it is first placed thereon by the operator. A nut of uniform diameter, such as to fit close on the smaller part of the bolt, could be used, elasticity of the branches enabling them to yield sufficiently for the nut to pass over the enlarged part of the bolt, and causing them to separate when it has passed, and thus bar its return; but a nut such as I have described has, when carried past the enlargement, a much securer seat on the bolt, and also passes over the enlargement with less friction.

Having thus described my invention, what I claim as new, and desire to secure by Letters Patent, is—

1. In combination with a nut, a bolt of elastic material, having for a part of its length a diameter greater than the least diameter of the nut, but having part of its thickness cut out by a slot crossing the said greater diameter, substantially as and for the purpose described.

2. A nut of an internal diameter decreasing from the face inward, in combination with a slotted bolt of elastic material, having for a part of its length and transversely to the slot a normally greater diameter than the smallest diameter of the nut, substantially as set forth.

3. In combination with a nut, a bolt of elastic material, having for a part of its length a diameter greater than the least diameter of the nut, tapering from said greater diameter, and having part of its thickness cut out by a slot crossing said greater diameter, substantially as and for the purpose described.

4. As a new article of manufacture, a nut of an internal diameter decreasing from the face inward, substantially as set forth.

5. A bolt of elastic material, having a longitudinal slot with an enlargement of curvilinear cross-section at its inner end, substantially as and for the purpose described.

CHARLES C. FAIRLAMB.

Witnesses:
ALLEN J. BEAUMONT,
JOS. H. LAMB.